United States Patent

Maxwell, Jr.

[15] 3,678,484

[45] July 18, 1972

[54] REVERSE-DIRECTION TAPE TRANSLATION

[72] Inventor: Albert H. Maxwell, Jr., Raleigh, N.C.

[73] Assignee: Westinghouse Electric Corporation, Pittsburgh, Pa.

[22] Filed: Dec. 23, 1969

[21] Appl. No.: 887,682

[52] U.S. Cl. ....................................340/174.1 H, 324/113
[51] Int. Cl. ..................G11b 5/02, G11b 19/26, G01r 13/04
[58] Field of Search ..............340/174.1 H, 174.1 A, 174.1 B; 179/100.2 R, 100.2 E, 100.2 MI; 324/113

[56] References Cited

UNITED STATES PATENTS

| | | | |
|---|---|---|---|
| 3,449,718 | 6/1969 | Woo | 340/174.1 B |
| 3,353,164 | 11/1967 | Folsom | 340/174.1 H |
| 3,205,316 | 9/1965 | Hechler | 179/100.2 MI |
| 3,531,787 | 9/1970 | Fuller | 340/174.1 A |
| 2,698,359 | 12/1954 | Roberts | 179/100.2 E |

*Primary Examiner*—Terrell W. Fears
*Assistant Examiner*—Gary M. Hoffman
*Attorney*—A. T. Stratton and C. L. Freedman

[57] ABSTRACT

A tape recorder is provided with a removable tape cartridge unit which contains a pay-out or supply reel and a take-up reel. A brake inhibits movement of the reels when the cartridge unit is removed from its operating position. During recording the tape is transferred from the supply to the take-up reel in a first direction. After recording the cartridge is placed in a translation device. The tape is now run in the opposite direction during translation to rewind the tape on the supply reel while carrying out the translating operation.

4 Claims, 9 Drawing Figures

WITNESSES:
Leon M. Garman
James F. Young

INVENTOR
Albert H. Maxwell, Jr.
BY C. L. [redacted]
ATTORNEY

REVERSE-DIRECTION TAPE TRANSLATION

BACKGROUND OF THE INVENTION

1. Field of the Invention:

This invention relates to tape recording and translating devices and methods and it has particular relation to tape recording and translating devices and methods for recording information in tape cartridges and translating such information into a different form.

Although the invention may be employed for recording information concerning various quantities in relation to time and translating such information, it is described for information concerning the consumption of an electric quantity, such as watthours, over a long period of time, such as one month.

2. Description of the Prior Art:

In order to conduct a survey showing the consumption of a variable quantity such as watthours of electric energy it was the practice to record a series of pulses on survey magnetic tape running in a first direction from a supply reel to a take-up reel in a recorder, each of the pulses representing the consumption of a predetermined amount of electric energy. A series of timing pulses occurring at regular intervals also was applied to the magnetic tape.

At the end of a survey period the tape was first rewound from the take-up to the supply reel. The tape next was run in the same first direction from the supply reel to a take-up reel, and the information thereon was transferred or translated to a ½inch magnetic tape or cards or was analyzed by a computer. Finally, the new take-up reel was transported as a new supply reel to the recorder. Examples of tape recorders will be found in the Snyder U.S. Pat. No. 3,059,239 and the Lenehan U.S. Pat. No. 3,148,329.

In some cases a plurality of tracks were recorded on a tape each representing a different function of a variable quantity. For example one track sometimes was provided for recording watthours whereas a second track was provided for recording var hours supplied to the same load. Such an arrangement is disclosed in the Snyder U.S. Patent No. 3,470,470.

SUMMARY OF THE INVENTION

In accordance with the invention, upon completion of a recording operation the cartridge is mounted on the translator and the tape is rewound on the supply reel. During the rewinding, information on the tape is read off and translated as desired. The translator is designed and operated to read off the information in an order which is the reverse of the order of recording. The information may be supplied to a computer which is programmed to analyze the data in reverse or to reverse the sequence of the data prior to analysis. The single rewind suffices to place the cartridge in condition for another recording operation. Preferably the recorded tape is held in its final recorded condition until it is ready for translation. The translation then starts from the last recording position. This minimizes handling and running of the tape, and it minimizes wear of the tape and apparatus associated with the tape.

DESCRIPTION OF THE PREFERRED EMBODIMENTS

Figures 1, 2, 3, 4:
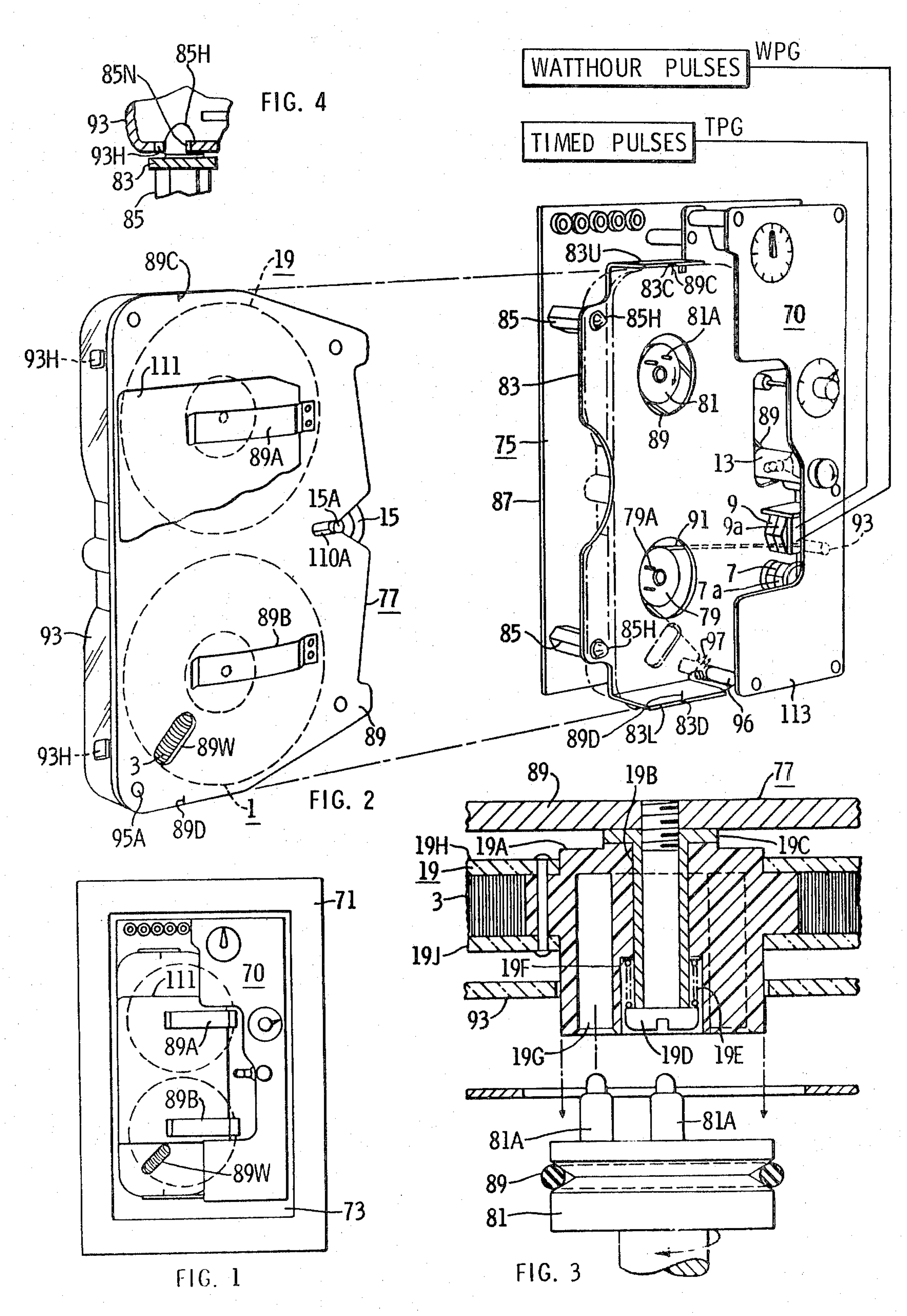
FIG. 1 is a view in front elevation of a recording device embodying the invention.
FIG. 2 is an exploded view in perspective showing a recording device having a cartridge unit displaced from its mounted position.
FIG. 3 is a detailed exploded view in cross-section with parts broken away showing a releasable coupling between a pulley and a tape reel.
FIG. 4 is a detail view showing a latch construction employed in the embodiment of FIGS. 1 and 2.

Referring to the drawings, FIG. 1 shows a recording device 70 mounted behind a cover represented by a rectangular frame 71 having a central window 73.

The recording device 70 is composed essentially of two main parts, a tape deck or support frame 75 and a cartridge unit 77. The support frame has mounted thereon an erase or bias heads 7 and 7a, record heads 9 and 9a and a capstan 13 which is arranged to rotate at a uniform rate in the direction of the arrow (clockwise in FIG. 2). These components 7, 7a, 9, 9a and 13 correspond functionally to the components bearing the same reference characters in the aforesaid Lenehan patent. It is assumed that watthour pulses are supplied by a generator WPG to the head 9 and that timed or interval pulses are supplied by a generator TPG to the head 9a in the manner discussed in the Lenehan patent.

The support frame 75 also has mounted thereon for rotation about spaced horizontal axes two V-grooved pulleys 79 and 81. These pulleys have one or more pins respectively 79A and 81A which are readily coupled to the pay-out or supply reel 1 and the take-up reel 19 when the cartridge unit is in mounted position.

It will be noted that the pulleys are exposed through windows in a middle plate 83 which is secured by posts 85 to a base plate 87. An endless belt 89 couples the pulley 81 to the capstan 13 for rotation in the direction of the arrow.

A drag is applied to the pulley 79 for the purpose of inhibiting free rotation thereof. This drag may take the form of a nylon cord having a portion located in the groove of the pulley. One end of the cord is secured to a post 93 and the remaining end of the cord is secured to a post 96 through a spring 97. The spring maintains a suitable tension in the cord which assures a proper drag action on the pulley.

The cartridge unit 77 mounts a supply reel 1 and a take-up reel 19 for rotation about spaced axes which correspond to the axes of the pulleys 79 and 81 when the cartridge unit is in mounted or operating position. The reels are mounted on a front plate or frame 89 which may be constructed of any suitable rigid material such as aluminum and are covered by a cover 93 which may be constructed of any suitable rigid material such as aluminum or preferably a transparent plastic. The cover is secured to the front plate by means of screws 95 and posts 95A. The posts 95A are riveted to the plate 89.

The mounting of the reels on the front plate 89 will be understood by consideration of the reel 19 as shown in FIG. 3. It will be noted that the reel 19 includes a hub 19A of any suitable rigid material such as a moldable plastic material. For example a phenolic resin or an acetal compound may be employed. The hub is rotatably mounted on a sleeve bearing 19B which has a flange 19C at one end and which is secured to the front plate 89 by means of a headed screw 19D. The hub is biased towards the flange 19C by means of a coil spring 19E which is compressed between the head of the screw 19D and a washer 19F which bears against a surface of the hub. It will be noted that the hub has a plurality of holes 19G distributed uniformly around the axis of the hub and positioned to receive the pins 81A. The reel is completed by two rigid flanges 19H and 19J which are riveted to the hub and between which the tape 3 is wound. It will be noted that the cover 93 has an opening through which the hub 19A extends.

In FIG. 3 if the cartridge unit 77 is moved downwardly the pins 81A are received in two of the holes 19G for the purpose of coupling the pulley 81 to the reel 19. When the cartridge unit thereafter is moved upwardly the coupling is broken.

Figure 5:
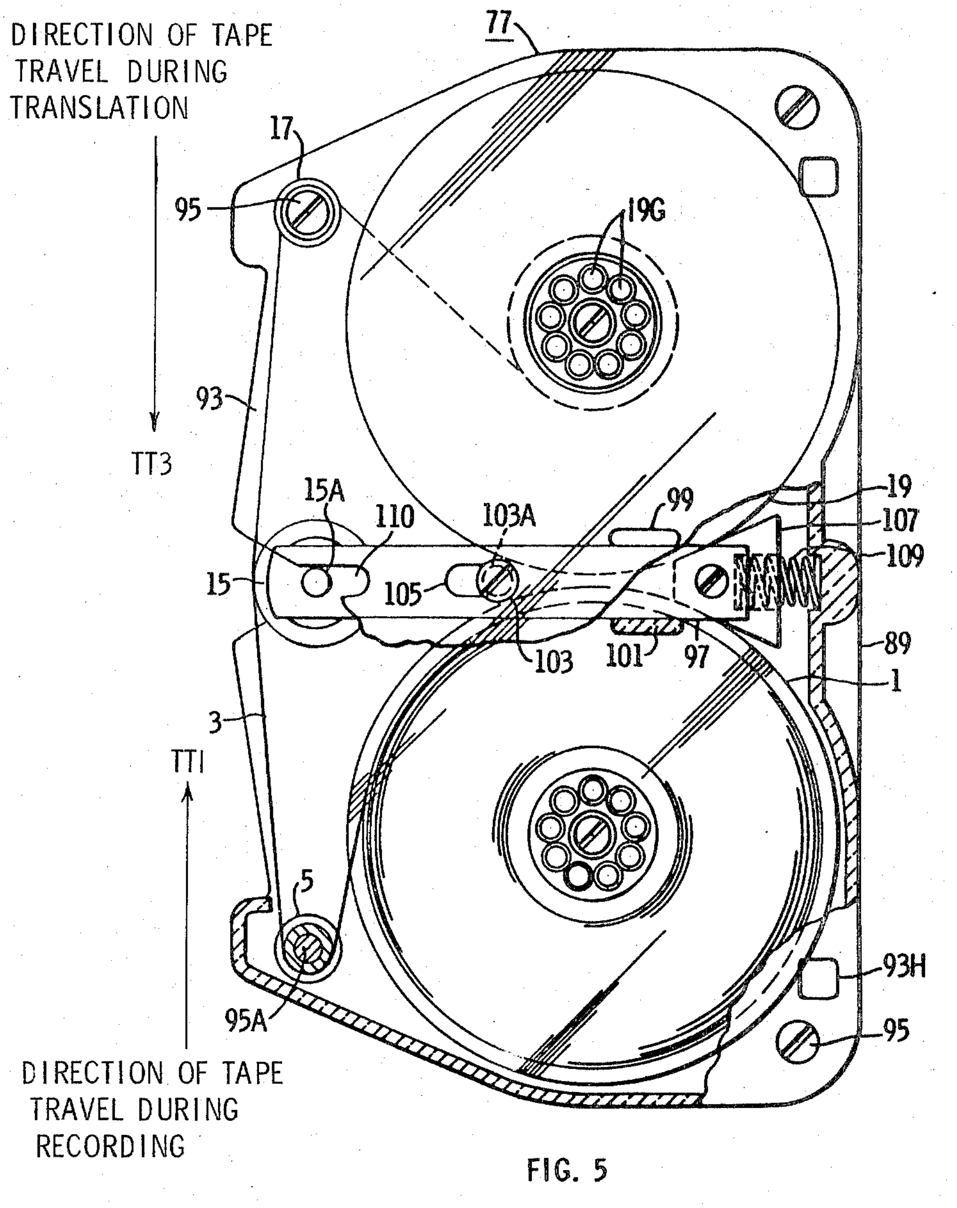
FIG. 5 is a view in elevation with parts broken away of a cartridge unit embodying the invention.

As shown in FIG. 5 the tape 3 moves over the pressure roller 15 and is guided by the guide rollers 5 and 17 between the inner sides of the reels 1 and 19. Thus during recording, the tape leaves the supply or pay-out reel 1 at the upper side of the reel, travels in the recording direction TT1, and enters the take-up reel 19 at the lower side of the reel. The rollers 5, 15 and 17 correspond in function to the rollers bearing the same reference characters in the aforesaid Lenehan patent. It will be noted that the rollers 5 and 17 are mounted for rotation on two of the posts 95A.

The pressure roller 15 is mounted for rotation on a slide 97. The slide is mounted for reciprocation to the right or left as viewed in FIG. 5 for a limited distance between two guide ribs 99 and 101 which form part of the cover 93 and which may be constructed during the molding operation as integral parts of the cover. A headed screw 103 is screwed into a post 103A which is riveted to the plate 89 and which extends through an elongated slot 105 formed in the plate 89. The head of the screw overlies the cover 93 to retain the cover in its position on the plate 89. The screws 95 and 103 are similar in construction and function.

At its right-hand end in FIG. 5 the slide carries a brake block 107 which engages the rim of the reels 1 and 19 to prevent or inhibit movement of the reels when the cartridge unit is displaced from its support frame. A coil spring 109 is compressed between the brake block 107 and a portion of the cover 93 for the purpose of biasing the brake block and slide towards the left as viewed in FIG. 5. Thus the spring urges the brake block into braking engagement with the reels.

As a further guide for the slide 97 and its associated components, the axle 15A of the pressure roller projects into guide notches 110 and 110A formed in the cover 93 and in the plate 89.

For facilitating the releasable mounting of the cartridge unit 77 the support frame carries an outer plate 113 with which the middle plate 83 forms a nest for receiving and locating the leading end of a cartridge unit when a cartridge unit is inserted in operating position. In addition the middle plate 83 has upper and lower flanges 83U and 83L bent forwardly from its upper and lower ends for the purpose of locating the cartridge unit vertically.

In order to latch releasably a cartridge unit in operating position the posts 85 are provided with domed heads 85H which project from the middle plate 83. As shown in FIG. 4 each domed head 85H projects through a hole 93H formed in the cover 93. Each domed head has a notch 85N for receiving and edge or lip of the cover 93.

In order to mount the cartridge unit 77 in FIG. 2, the unit is moved to the right and the leading edge is nested between the outer and middle plates 113 and 83. As the cartridge unit is moved to the right the pressure roller 15 forces the magnetic tape passing thereover against the capstan 13 and compresses the spring 109 (FIG. 5). This moves the brake block 107 away from the reels 1 and 19 to prepare the reels for subsequent operation.

The movement of a cartridge unit carries the holes 93H into alignment with the domed heads 85H. The cartridge unit now may have its trailing end forced against the middle plate 83 and this movement causes the domed heads 85H to enter the holes 93H. When the cartridge unit is released the spring 109 forces the cartridge unit to the left as viewed in FIG. 2 and this movement causes the notches 85N (FIG. 4) to receive edges of the cover 93. This releasably latches the cartridge unit in operating position. The cartridge unit may be released from its operating position by following a reverse sequence of the mounting movements.

In order to facilitate proper installation of the cartridge unit 77 the plate 89 is provided with upper and lower marks 89C and 89D. Companion alignment marks 83C and 83D are provided respectively on the flanges 83U and 83L. When the cartridge unit is properly installed the alignment marks 89C and 89D are aligned respectively with the alignment marks 83C and 83D.

With the orientation of the cartridge unit essentially parallel to the front of the instrument a large identification card 111 is visible not only when the cartridge unit is displaced from the support frame but when the cartridge unit is in its operating position. Similarly the window 89W always exposes the amount of tape on the supply reel 1. The alignment marks 89C, 89D, 83C and 83D are always visible to indicate proper alignment of the cartridge unit.

As previously noted the spring 109 not only provides proper pressure of the tape 3 against the capstan 13, but also provides proper pressure of the brake block 107 against the rim of the reels 1 and 19. The spring also provides latching pressure for maintaining the cartridge unit in its proper operating position.

The apparatus of FIGS. 1–5 is described in a descriptive bulletin DB 42-565 WR dated Jan. 1969 and instruction leaflet I.L. 42-565 WR-1 dated Jan. 1969 and published by the Westinghouse Electric Corporation, Raleigh, North Carolina, and is the subject matter of Pat. application Ser. No. 832,118, filed June 11, 1969, now Pat. No. 3,602,458, by Doby et al, which is assigned to the same assignee.

Following completion of a recording operation the cartridge unit 77 is removed from the support frame 75 and is mounted in a translater (FIG. 6) which has a frame 115 similar to the support frame 75 for receiving and driving the tape of the cartridge unit, but at speeds higher than the speed employed during recording. Except for the frame 115 the translator of FIG. 6 may be similar to the tape-to-card translator described on page 2 of a descriptive bulletin DB42-570 published by the Westinghouse Electric Corporation, Raleigh, North Carolina.

Figures 6, 7, 8, 9:
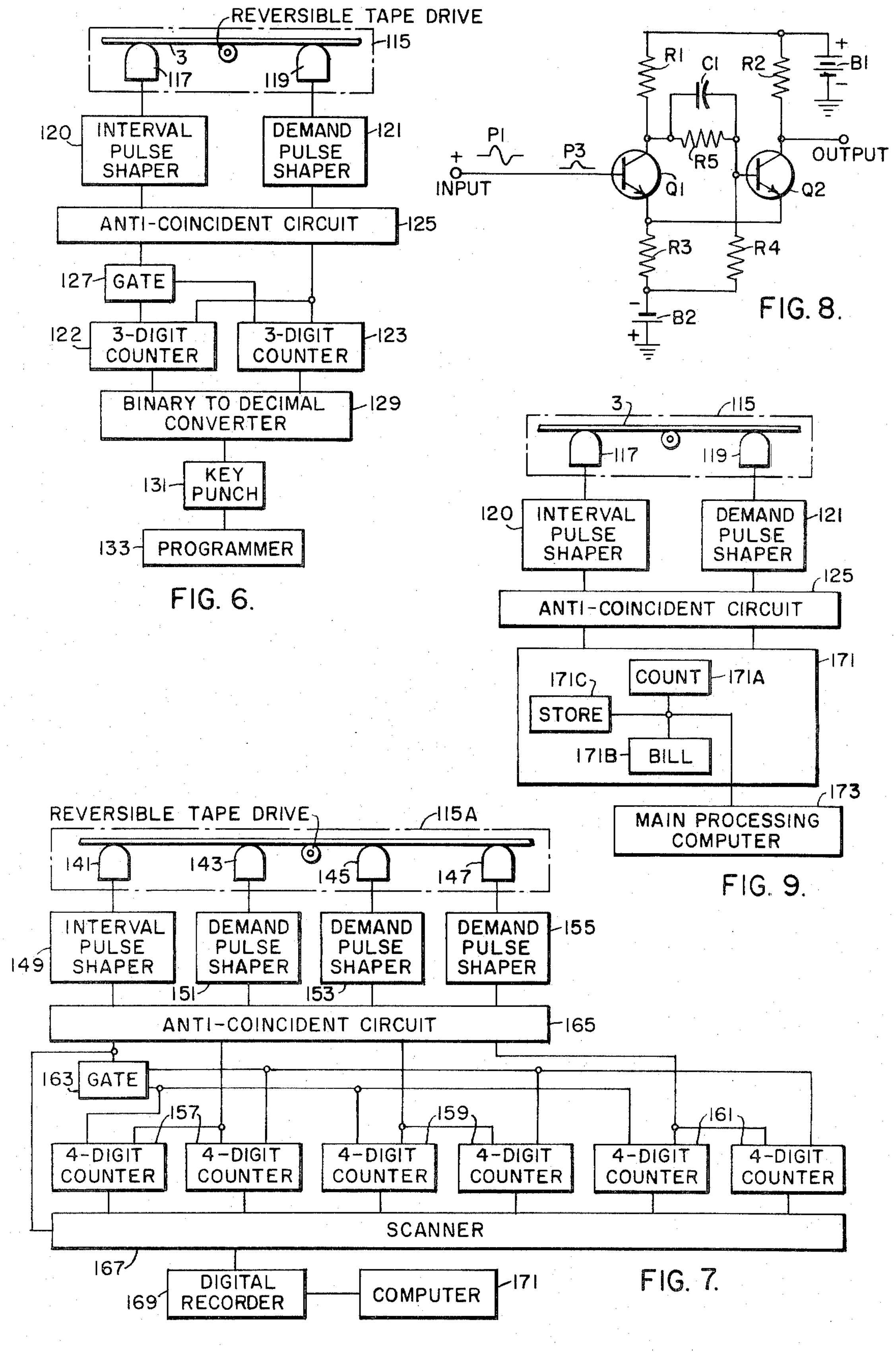
FIGS. 6, 7 and 9 are block diagrams of translation devices suitable for translating information on tape.
FIG. 8 is a diagrammatic representation of a Schmitt trigger circuit.

For convenience in illustration, the translator of FIG. 6 has two tape heads 117 and 119 for reading pulse information recorded respectively in a time or interval track and a demand track of a magnetic tape. In practice one head providing the two tracks usually would be employed. The interval and demand pulses derived from the heads are shaped, if desired, by suitable pulse shapers 120 and 121 and the shaped pulses are supplied to counters 122 and 123 which alternately count the demand pulses occurring during successive intervals. If the possible loss of a pulse count due to coincidence of interval and demand pulses is not desired, a standard anti-coincidence circuit 125 may be employed.

The demand pulses are supplied to one input of each counter whereas the interval pulses are supplied to a gate 127 which renders the counters alternately effective for counting pulses occurring in an interval. The outputs of the counters are in binary form and are converted to decimal form by a converter 129. The decimal output is utilized as an input to a key punch machine 131 which punches the total count on business machine cards in a conventional manner which may employ the well-known Hollerith code. A coded date programmer 133 may be utilized for sequentially numbering and identifying the cards.

The cartridge unit 77 may be removed from the recorder before the tape has been fully transferred to the take-up reel. The brake block 107 holds the tape in its last recording position until a translation is started. Preferably the tape is moved in the recording direction for a short distance such as six inches to make certain that no data is missed. The tape then is moved in a direction opposite to the recording direction (the direction TT3 in FIG. 5) to rewind the tape on the supply reel. During this rewind, the information is derived from the tape in the reverse order to its recording. It may be transferred in this reverse order to a new medium such as business-machine cards. A computer may be programmed to reverse the order of the derived information so that the resultant information is in the same order or sequence as that initially recorded.

In FIG. 7 a translator has a frame 115A which is similar to the frame 115 except that it illustrated with four heads 141, 143, 145 and 147 suitable for reading four tracks of a tape recorded as described in the aforesaid Snyder U.S. Pat. No. 3,470,470. (Preferably, in practice one four-track head would be employed). The interval and demand pulses derived from the four heads are shaped, if desired, by suitable pulse shapers 149, 151, 153 and 155. Each set of demand pulses is supplied to a separate pair of counters 157, 159, 161, each pair having its two counters rendered alternately effective for counting pulses occurring in an interval by a gate 163 controlled by the interval pulses. If the possible loss of a pulse count due to coincidence of interval and demand pulses is not desired, the shape pulses may be supplied to the gate and counters through an anti-coincident circuit 165. While one counter of a pair is counting, the output of the other counter of the pair is coded and entered on a magnetic computer tape in a sequence controlled by the interval pulses which together with the outputs of the counters are supplied to a scanner 167, and the sequential outputs of the counters as supplied by the scanner constitute the inputs to a digital recorder 169. The digital recorder may include a programmer which may be adjusted to apply suitable identifying information to each computer tape.

The computer tape is next run through a conventional computer 171.

Except for the frame 115 the translator of FIG. 7 may be similar to the tape-to-tape translator described on page 3 of the aforesaid descriptive bulletin DB 42-570.

A fully or partially recorded cartridge 77 is removed from the recorder and mounted on the frame 115A of the translator of FIG. 7. During transit and handling, the brake block 107 prevents displacement of the tape. As previously noted, the tape may be moved about six inches in the recording direction to make certain that no information is missed in translation.

The tape then is moved in a direction opposite to its recording direction to rewind the tape on the supply reel and, during such rewind, to derive interval and demand pulses through the tape heads 141-147.

Information is applied to the computer tape in a sequence which is the reverse of the recording sequence. However, the computer can be programmed to analyze the data on the computer tape in reverse or to reverse the sequence of the data prior to analysis. Preferably the system is so arranged that an effective false time or interval pulse is not introduced by lifting the tape from the recording head on the bias magnet when the cartridge is removed after a recording operation. It is assumed that demand pulses are recorded by the conventional "non-return to zero" (NRZ) technique, and that for the interval pulses a return-to-bias (RB) recording technique is employed.

For the RB technique no current flows in the tape head to cause a false pulse. The normal interval pulse from the tape head is a bi-directional, high-level pulse whereas a false pulse caused by removing the tape from the bias magnet is a low-level uni-directional pulse which may be termed "noise." Preferably a circuit which distinguishes between the two pulses is employed for blocking the false pulses. Thus the discrimination between pulses may be based on level or on whether the pulses are bi-directional or uni-directional. Such a circuit is a voltage-sensitive Schmitt trigger circuit which passes the high-level pulses, but blocks the low-level false pulses. It will be assumed that the shaper 119 and 149 comprises a Schmitt trigger circuit employed in this way.

A Schmitt trigger circuit is represented in FIG. 8, and employs two transistors Q1 and Q2 which are shown as NPN transistors. (For PNP transistors the battery and input voltages would be reversed.)

The collectors of the transistors are connected to ground through resistors R1 and R2 respectively and a common battery B1 having its negative terminal grounded. The emitters are connected to ground through a resistor R3 and through a common battery B2 which has its positive terminal grounded. The collector of the transistor Q1 is connected to the base of the transistor Q2 through a resistor R5 shunted by a capacitor C1 and the base of the transistor Q2 is connected to the negative terminal of the battery B2. The output is shown as taken from the collector of the transistor Q2.

For low input voltages the transistor Q1 is nonconductive and the transistor Q2 is saturated. When the input voltage exceeds a predetermined trigger value the transistor Q1 saturates and the transistor Q2 becomes non-conductive.

By varying the relative sizes of the resistors R1 and R2, the circuit can be built with a desired degree of hysteresis. A relationship is selected which causes the input voltage to go significantly lower than the original trigger value before the circuit will return to its original state of Q1 non-conducting and Q2 saturated. This excludes the uni-directional false pulse and the circuit triggers only on the bi-directional pulse.

If desired the information recorded on the tape may be supplied directly to a suitable standard computer. Thus in FIG. 9 the frame 115 is shown for supplying pulses to the computer 171. If desired the pulse shapers 120 and 121, and the anti-coincidence circuit 125 may be again utilized. With this direct connection, the computer may be programmed to store the pulses, to count the pulses in the desired sequence, to compute bills, to provide data for another computer or for recording on tape, or in any other desired manner. Thus the computer 171 may count the pulses in a counting section 171A. The output of the counting section may be utilized to prepare bills in a billing section 171B or transmitted by a data link to a main data-processing computer 173 or utilized to write a computer tape or stored in any desired manner in a storage section 171C.

By starting translation in the rewind direction from the last recording position, translation is expedited by eliminating two rewind operations. This saves time for both the machine and the operator. This invention also reduces materially wear on the cartridge, on the playback deck and on the playback tape heads.

I claim:

1. In a tape translating device for reproducing at one location plural recorded tracks including a first track of spaced interval signals and a second track of time related information signals, said signals having been recorded at another location in a continuous sequence on a magnetic tape beginning with an initially recorded signal and ending with a last recorded signal each recorded adjacent an opposite end of said tape after movement in a single recording direction, the combination comprising: a first reel and a second reel; said first reel retaining said tape in a stationary wound position, said stationary position being the position assumed by said tape after recording said last recorded signal; means for counting said signals on said tape with said counting beginning at said last recorded signal and ending at said initially recorded signal; means for mounting said first reel and said second reel when said first reel contains said tape in said stationary position; means for winding said tape onto said second reel from said first reel in a direction opposite to said recording direction; and a tape-head pick-up means responsive to said signals on said tape for applying said signals to the counting means when said tape is wound from said first reel to said second reel, said second reel being wound with said tape in a final condition upon said initial recorded signals passing said pick-up means such that with said tape being in said final condition on said second reel it is directly usable for movement in said recording direction to record further of said signals without further winding.

2. In a tape translating device as claimed in claim 1, level-sensitive means associated with said tape-head pickup means for blocking signals supplied by said tape-head pickup means having a level on one side of a predetermined value and passing signals supplied by said tape-head pickup means having a level on the other side of said predetermined value.

3. A tape translating device as claimed in claim 1 wherein the second and first reels are tape supply and take-up reels, respectively, and including a cartridge in which the first and second reels are permanently associated, said mounting means being designed to mount said cartridge releasably in operating position.

4. A tape translating device as claimed in claim 1, wherein the tape pickup-up means includes first and second tape-head pickup means for picking up information from the first and second magnetic tracks on the magnetic tape, and means gated by the interval signals derived by said first pickup means from the first magnetic track for counting information derived by said second pickup means from the second magnetic track.

* * * * *